US012776716B2

(12) United States Patent

Escudero Rodriguez et al.

(10) Patent No.: US 12,776,716 B2

(45) Date of Patent: Oct. 27, 2026

(54) PHASE-SHIFT FULL BRIDGE CONVERTER

(71) Applicant: Infineon Technologies Austria AG, Villach (AT)

(72) Inventors: Manuel Escudero Rodriguez, Vienna (AT); Matteo-Alessandro Kutschak, Ludmannsdorf (AT)

(73) Assignee: Infineon Technologies Austria AG, Villach (AT)

(*) Notice: Subject to any disclaimer, the term of this patent is extended or adjusted under 35 U.S.C. 154(b) by 191 days.

(21) Appl. No.: 18/756,637

(22) Filed: Jun. 27, 2024

(65) Prior Publication Data

US 2026/0005614 A1 Jan. 1, 2026

(51) Int. Cl.
*H02M 3/335* (2006.01)

(52) U.S. Cl.
CPC ... *H02M 3/33573* (2021.05); *H02M 3/33592* (2013.01)

(58) Field of Classification Search
CPC ...................... H02M 3/33573; H02M 3/33592
See application file for complete search history.

(56) References Cited

U.S. PATENT DOCUMENTS

2014/0177281 A1* 6/2014 Lai ...................... H02M 3/3353 363/17
2021/0376741 A1* 12/2021 Escudero Rodriguez .................. H02M 3/33573

OTHER PUBLICATIONS

"Electrical Characteristics and Electrical Safety of High Voltage Components in Road Vehicles", Volkswagen, VW 80303, Edition: LV123, Jun. 2014, pp. 1-164.
Escudero, Manuel, et al., "A Practical Approach to the Design of a Highly Efficient PSFB DC-DC Converter for Server Applications", Energies, 12, 3723, doi:10.3390/en12193723, www.mdpi.com/journal/energies, Sep. 29, 2019, pp. 1-36.
Escudero, Manuel, et al., "Modulation Scheme for the Bidirectional Operation of the Phase-Shift Full-Bridge Power Converter", IEEE Transactions on Power Electronics, vol. 35, No. 2, Feb. 2020, pp. 1377-1391.
Escudero, Manuel, et al., "On the Practical Evaluation of the Switching Loss in the Secondary Side Rectifiers of LLC Converters", Energies 2021, 14, 5915. https://doi.org/10.3390/en14185915, Sep. 17, 2021, pp. 2-23.
Escudero, Manuel, et al., "Synchronous Rectifiers Drain Voltage Overshoot Reduction in PSFB Converters", IEEE Transactions on Power Electronics, vol. 35, No. 7, Jul. 2020, pp. 7419-7433.

* cited by examiner

*Primary Examiner* — Harry R Behm
(74) *Attorney, Agent, or Firm* — Murphy, Bilak & Homiller, PLLC

(57) ABSTRACT

A phase shift full bridge (PSFB) converter includes: a transformer having primary and secondary sides; a first pair of switch devices connected in series at a first node coupled to a first terminal of the primary side; a second pair of switch devices connected in series at a second node coupled to a second terminal of the primary side; diode devices connected in series at a third node coupled to the first terminal; an inductor coupled between the first and third nodes; a secondary-side rectifier; and a controller. In one mode, the controller operates the second pair of switch devices as a leading power transfer leg and the first pair of switch devices as a lagging power transfer leg. In another mode, the controller operates the first pair of switch devices as the leading power transfer leg and the second pair of switch devices as the lagging power transfer leg.

21 Claims, 7 Drawing Sheets

PHASE-SHIFT FULL BRIDGE CONVERTER

BACKGROUND

On-board DC-DC converters traditionally convert from a 400 $V_{DC}$ battery to a 12 $V_{DC}$ battery. However, new requirements and forecasts indicate a move into higher nominal voltage ranges such as 48 $V_{DC}$. Shifting from 12 $V_{DC}$ to 48 $V_{DC}$ allows for supporting higher power requirements, with further wiring and loss advantages when utilizing a higher voltage distribution. Moreover, a 48 $V_{DC}$ battery voltage with a working range of 36 $V_{DC}$ up to 60 $V_{DC}$ is considered safe to human touch.

Because the input of an on-board DC-DC converter is feed itself by a battery, the input range also can be very wide, extending in some applications from 250 $V_{DC}$ up to 450 $V_{DC}$. More generally, for a 48 $V_{DC}$ battery on the output side of an on-board DC-DC converter, the input voltage may range from 250 $V_{DC}$ up to 900 $V_{DC}$ and the output voltage may range from 36 $V_{DC}$ up to 60 $V_{DC}$. The maximum power output may be up to 2000 W or higher, at an efficiency requirement of 97% or higher over a temperature range of −25° C. to 75° C.

Due to such a wide input voltage range, wide output voltage range and relative high output current, a PSFB (phase-shift full bridge) converter is a well-suited topology to address this application. The PSFB topology is an isolated buck derivative, where the voltage gain is controlled by the effective duty of the primary-side full-bridge, usually operated at a fixed switching frequency. The PSFB topology, like a non-isolated buck, can potentially regulate from near the input voltage down to 0 $V_{DC}$ at the output, with additional gain given by the transformer turn-ratio in the isolated version.

However, the drain voltage of the rectifiers on the secondary side of a PSFB converter is unclamped by capacitors, unlike other topologies, such as DAB (dual active bridge) or LLC. An overshoot caused by oscillations between the series inductance and the output capacitance of the rectifiers necessitates the use of a higher voltage class rectifiers or snubber techniques. Also, a circulation current flows in the primary side during the freewheeling time, i.e. the remaining time of the period not part of the duty (active switching). The circulation current does not transfer power to the output but causes conduction loss. Furthermore, the lagging power transfer leg of a PSFB, i.e. the leg commutating at the end of each power transfer cycle, achieves ZVS (zero-voltage switching) across all load range by using the energy in the output inductor. However, the leading power transfer leg only utilizes the energy in the series inductor and is also load dependent, losing full ZVS at lighter load conditions.

Hence, there is a need for a more robust PSFB converter design over a wide range of input voltages, output voltages, and load conditions.

SUMMARY

According to an embodiment of a phase shift full bridge (PSFB) converter, the PSFB converter comprises: a transformer having a primary side and a secondary side; a full-bridge comprising a first pair of switch devices connected in series at a first node coupled to a first terminal of the primary side, and a second pair of switch devices connected in series at a second node coupled to a second terminal of the primary side; a pair of diode devices connected in series at a third node coupled to the first terminal of the primary side; an inductor coupled between the first node and the third node; a rectifier coupled to the secondary side; and a controller, wherein in a first mode, the controller is configured to operate the second pair of switch devices as a leading power transfer leg and the first pair of switch devices as a lagging power transfer leg each power transfer cycle, wherein in a second mode, the controller is configured to operate the first pair of switch devices as the leading power transfer leg and the second pair of switch devices as the lagging power transfer leg each power transfer cycle, wherein the controller is configured to seamlessly transition between the first and second modes without interruption of the PSFB converter.

According to an embodiment of a method of operating a phase shift full bridge (PSFB) converter that includes a transformer having a primary side and a secondary side, a full-bridge comprising a first pair of switch devices connected in series at a first node coupled to a first terminal of the primary side, and a second pair of switch devices connected in series at a second node coupled to a second terminal of the primary side, a pair of diode devices connected in series at a third node coupled to the first terminal of the primary side, an inductor coupled between the first node and the third node, and a rectifier coupled to the secondary side, the method comprises: in a first mode, operating the second pair of switch devices as a leading power transfer leg and the first pair of switch devices as a lagging power transfer leg each power transfer cycle; in a second mode, operating the first pair of switch devices as the leading power transfer leg and the second pair of switch devices as the lagging power transfer leg each power transfer cycle; and seamlessly transitioning between the first and second modes without interruption of the PSFB converter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a phase shift full bridge (PSFB) converter and related control technique. The converter is operated with the leading power transfer leg connected to the primary-side snubber diodes at light load conditions. The converter is operated with the lagging power transfer leg connected to the primary-side snubber diodes at mid and heavy load conditions. The controller seamlessly transitions between the modes without interruption of the PSFB converter.

The PSFB converter and related control technique described herein reduce overshoot in the secondary side rectifiers, allowing the use of 200 $V_{DC}$ rated devices for high power (e.g., 2 kW or higher) DC-DC on-board low voltage converter applications. The PSFB converter and related control technique described herein also allow for the possibility of boosting efficiency of the converter, by choosing the operation mode that gives the best performance.

Described next with reference to the figures are embodiments of the PSFB converter and related control technique.

Figure 1:
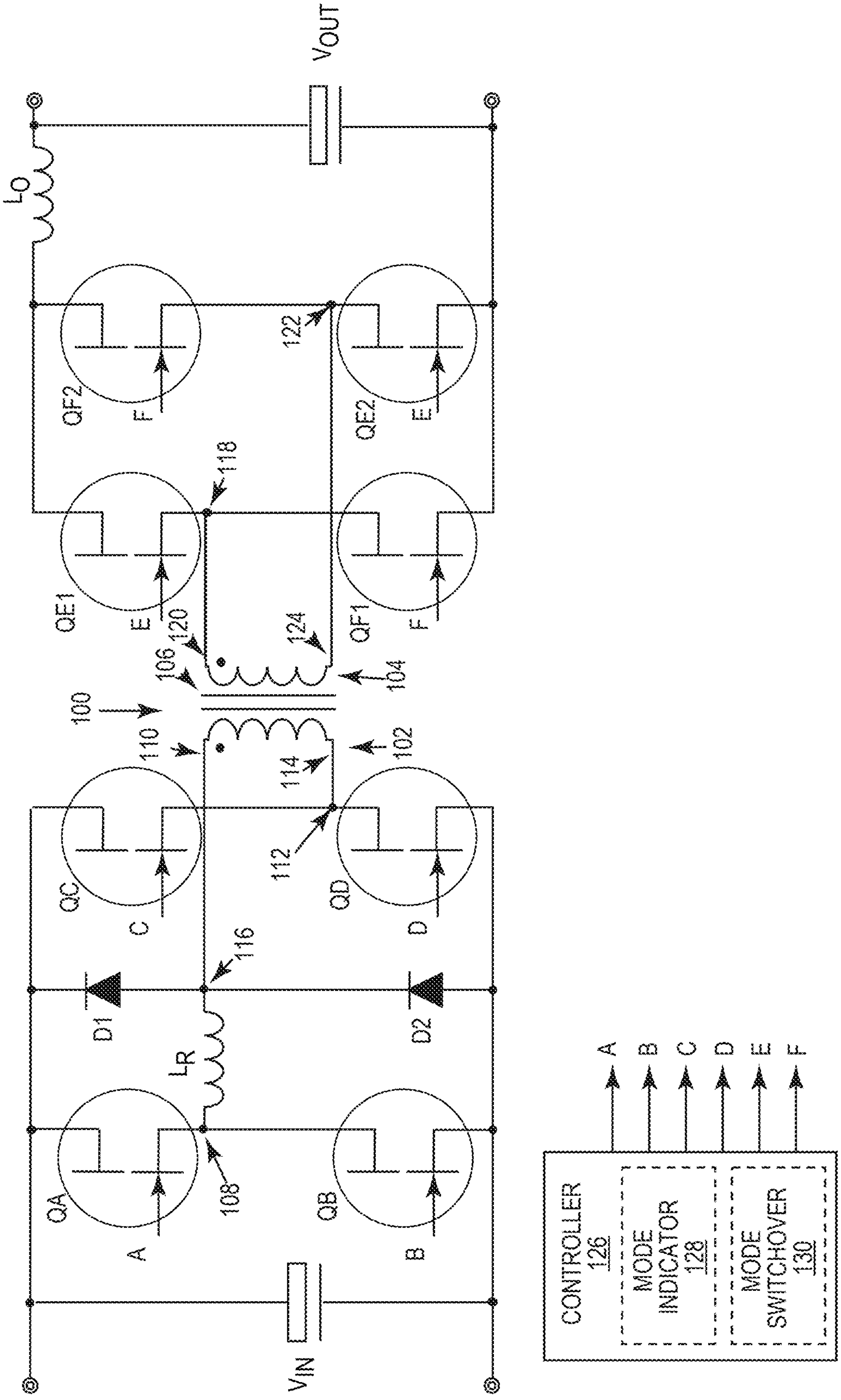
FIG. 1 illustrates a schematic diagram of an embodiment of a phase-shift full bridge (PSFB) converter.

FIG. 1 illustrates an embodiment of a PSFB converter. The PSFB converter includes a transformer 100 having a primary side 102 and a secondary side 104. The primary side 102 and the secondary side 104 of the transformer 100 may each include one or more coils (windings) wound around the transformer core 106.

The PSFB converter also includes a full-bridge having a first pair of switch devices QA, QB connected in series at a first node 108 coupled to a first terminal 110 of the transformer primary side 102, and a second pair of switch devices QC, QD connected in series at a second node 112 coupled to a second terminal 114 of the transformer primary side 102. A pair of diode devices D1, D2 is connected in series at a third node 116 coupled to the first terminal 110 of the transformer primary side 102. An (series) inductor $L_R$ is coupled between the first node 108 and the third node 116. The diode devices D1, D2 function as snubber or clamping devices, reducing overshoot on the secondary side of the PSFB converter caused by oscillations between the series inductance $L_O$ and the output capacitance of the rectifier coupled to the transformer secondary side 104.

FIG. 1 illustrates the secondary-side rectifier as a synchronous rectifier having a first actively switched rectification leg formed by a third pair of switch devices QE1, QF1 connected in series at a fourth node 118 coupled to a first terminal 120 of the transformer secondary side 104, and a second pair of switch devices QF2, QE2 connected in series at a fifth node 122 coupled to a second terminal 124 of the transformer secondary side 104. Other types of rectifier configurations may be used on the secondary-side of the PSFB converter, such as but not limited to, a current-fed push-pull, center-taped or current doubler rectification stage, etc.

In one embodiment, the primary-side and secondary-side switch devices QA-QD, QE1-QF2 are GaN switch devices such as HEMTs (high-electron mobility transistors). GaN switch devices support relatively higher switching frequencies compared to Si switch devices, e.g. 300 kHz. This is just an example, however. Other switching frequencies may be supported, and other semiconductor technologies may be used to implement the switch devices, e.g., such as Si and SiC switch devices. For example, the switch devices QA-QF2 may be implemented as power MOSFETs (metal-oxide-semiconductor field-effect transistors), IGBTs (insulated gate bipolar transistors), etc.

The controller 126 of the PSFB converter controls the primary-side and secondary-side switch devices QA-QD, QE1-QF2 via corresponding control signals A-F, so as to convert from an input battery VIN to an output battery $V_{OUT}$. For example, the PSFB converter may convert from a nominal input battery voltage of 400 $V_{DC}$ to a nominal output battery voltage of 48 $V_{DC}$. This is just an example, however. The PSFB converter may convert from other input battery levels to other output battery levels. More generally, the PSFB converter converts from an input battery VIN in a range of 250 $V_{DC}$ to 900 $V_{DC}$ to an output battery $V_{OUT}$ in a range of 12 $V_{DC}$ to 60 $V_{DC}$.

In a (first) lagging mode, the controller 126 operates the second pair of primary-side switch devices QC, QD as the leading power transfer leg and the first pair of primary-side switch devices QA, QB as the lagging power transfer leg each power transfer cycle. This means that the first pair of primary-side switch devices QA, QB lags the second pair of primary-side switch devices QC, QD in power transfer/delivery each power transfer cycle. In other words, in the lagging mode, the second pair of primary-side switch devices QC, QD energizes the series inductor $L_R$ during a first part of each power transfer cycle and the first pair of primary-side switch devices QA, QB energizes the series inductor $L_R$ during a second part of each power transfer cycle that follows the first part.

In a (second) leading mode, the controller 126 operates the first pair of primary-side switch devices QA, QB as the leading power transfer leg and the second pair of primary-side switch devices QC, QD as the lagging power transfer leg each power transfer cycle. This means that the first pair of primary-side switch devices QA, QB leads the second pair of primary-side switch devices QC, QD in power transfer/delivery each power transfer cycle. In other words, in the leading mode, the first pair of primary-side switch devices QA, QB energizes the series inductor $L_R$ during the first (earlier) part of each power transfer cycle and the second pair of primary-side switch devices QC, QD energizes the series inductor $L_R$ during the second (later) part of each power transfer cycle.

The controller 126 seamlessly transitions between the first and second modes without interruption of the PSFB converter. That is, the control signals A-D used to switch the primary-side devices QA-QD are uninterrupted and no change in output current occurs when the controller 126 transitions between the first and second modes. The leading and lagging power transfer legs can be switched by a relative shift between the control signals A-D, e.g., PWM (pulse width modulation) carriers of both power transfer legs.

Figure 2:
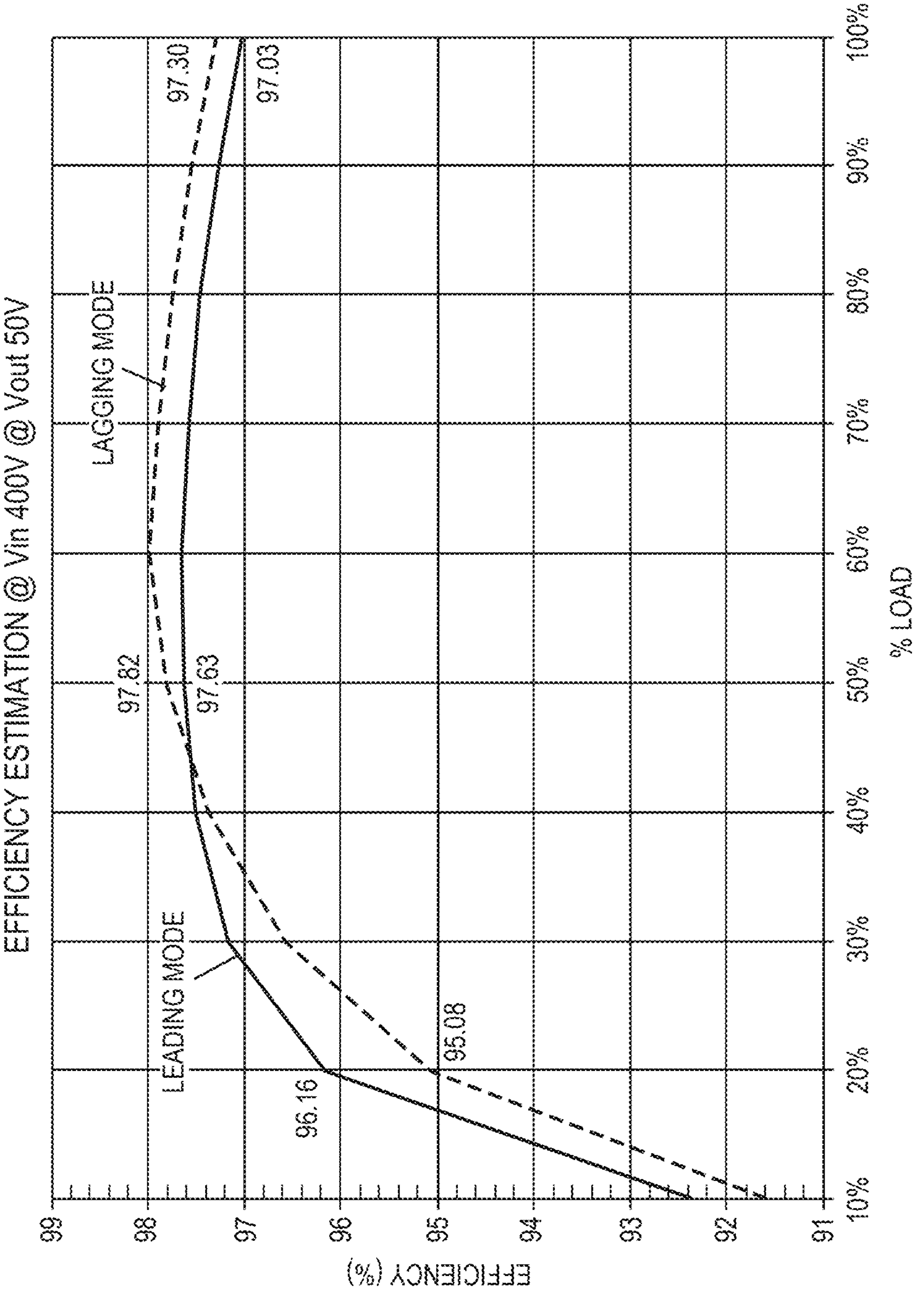
FIG. 2 illustrates an estimation of the PSFB efficiency for a nominal input battery voltage of 400V and a nominal output battery voltage of 50V, in both leading mode and lagging mode.

FIG. 2 illustrates an estimation of the PSFB efficiency for a nominal input battery voltage of 400V and a nominal output battery voltage of 50V, in both the leading mode and the lagging mode. Each mode has a better efficiency over a distinct load range. For example, the leading mode is more efficient under lighter load conditions (e.g., less than 45% loading) and the lagging mode is more efficient under heavier load conditions (e.g., greater than 45% loading). The controller 126 may include a mode indicator 128 that indicates when the controller 126 is to transition from one mode to the other mode. The mode indicator 128 may be predetermined or adjustable, e.g., as a register setting, look-up table, etc. In one embodiment, the controller 126 adjusts the mode indicator 128 based on efficiency data collected during use of the PSFB converter.

When load conditions indicate a mode switchover is warranted, the mode indicator 128 indicates to switchover logic 130 of the controller 126 that a mode switch should be performed. This way, the PSFB converter is operated in the most efficient manner regardless of load conditions. For example, the controller 126 may operate the PSFB converter in the lagging mode at heavier load conditions and operate the PSFB converter in the leading mode at lighter load conditions. Without interrupting operation of the PSFB converter, the switchover logic 130 seamlessly transitions from one mode to the other mode.

The shape of the efficiency curves and the crossing point (around 45% in the example illustrated in FIG. 2) depends on several variables, including the input and output voltages. Several curves could be generated offline or calculated by the controller 126 during runtime, to account for different input and output voltage combinations. The highest convert efficiencies are achieved at the highest output voltages, where the primary side circulation current is the lowest. Nevertheless, the PSFB converter and related control technique described herein yields high efficiency for all input and output ranges, not just a high-peak at a fixed operating point.

Figure 3B:
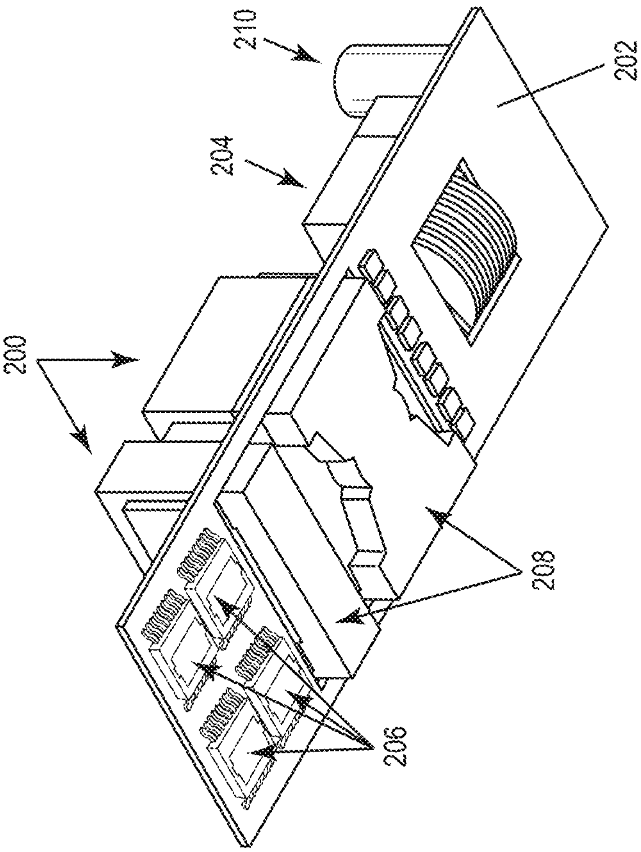
FIG. 3B illustrates a corresponding bottom perspective view.
Figure 3A:
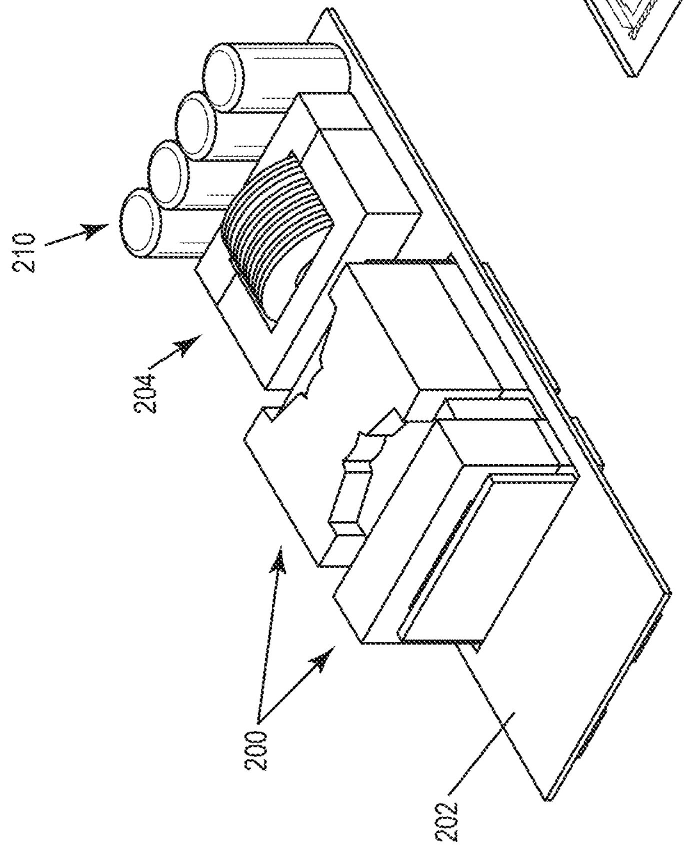
FIG. 3A illustrates a top perspective view of a physical implementation of the PSFB converter.

FIG. 3A illustrates a top perspective view of a physical implementation of the PSFB converter, and FIG. 3B illustrates a corresponding bottom perspective view. According to this embodiment, planar magnetics 200 integrate the primary-side inductor $L_R$ and the transformer 100 in the same PCB (printed circuit board) structure 202. The output inductor $L_O$ of the PSFB converter is implemented with helical flat copper windings 204. The system may be cooled by a cooling plate (not shown), e.g. with liquid cooling. Accordingly, top-side (exposed metal) cooled devices 206 may be used for some or all of the switch devices QA-QF2 and exposed surfaces 208 of the magnetics 200 may be cooled at the bottom side of the PSFB converter. An output capacitor bank 210 may be mounted to the same PCB as the magnetics 200, e.g. in close proximity to the output inductor $L_O$ which is implemented with helical flat copper windings 204 in this example.

Described next in more detail is the control technique for switching between modes. The control technique will be described in the context of both voltage control and (peak) current control. In either voltage control or peak current control, to seamlessly transition from one mode to the other mode without interruption of the PSFB converter, the controller 126 may terminate the pair of switch devices QA, QB or QC, QD acting as the leading power transfer leg at the end of the present power transfer cycle so that this pair of switch devices becomes the lagging power transfer leg for the next power transfer cycle, and extend the pair of switch devices acting as the lagging power transfer leg into the next power transfer cycle so that this pair of switch devices becomes the leading power transfer leg for the next power transfer cycle.

To transition from the lagging mode to the leading mode, the controller 126 may shorten a pair of PWM pulses A, B that control the first pair of switch devices QA, QB and lengthen a pair of PWM pulses C, D that control the second pair of switch devices QC, QD at the end of the last power transfer cycle in the first mode. Accordingly, the first pair of switch devices QA, QB becomes the leading power transfer leg and the second pair of switch devices QC, QD becomes the lagging power transfer leg for the first power transfer cycle in the second mode.

To transition from the leading mode to the lagging mode, the controller 126 may lengthen a pair of PWM pulses A, B that control the first pair of switch devices QA, QB and shorten a pair of PWM pulses C, D that control the second pair of switch devices QC, QD at the end of the last power transfer cycle in the second mode. Accordingly, the second pair of switch devices QC, QD becomes the leading power transfer leg and the first pair of switch devices QA, QB becomes the lagging power transfer leg for the first power transfer cycle in the first mode.

Figure 4:
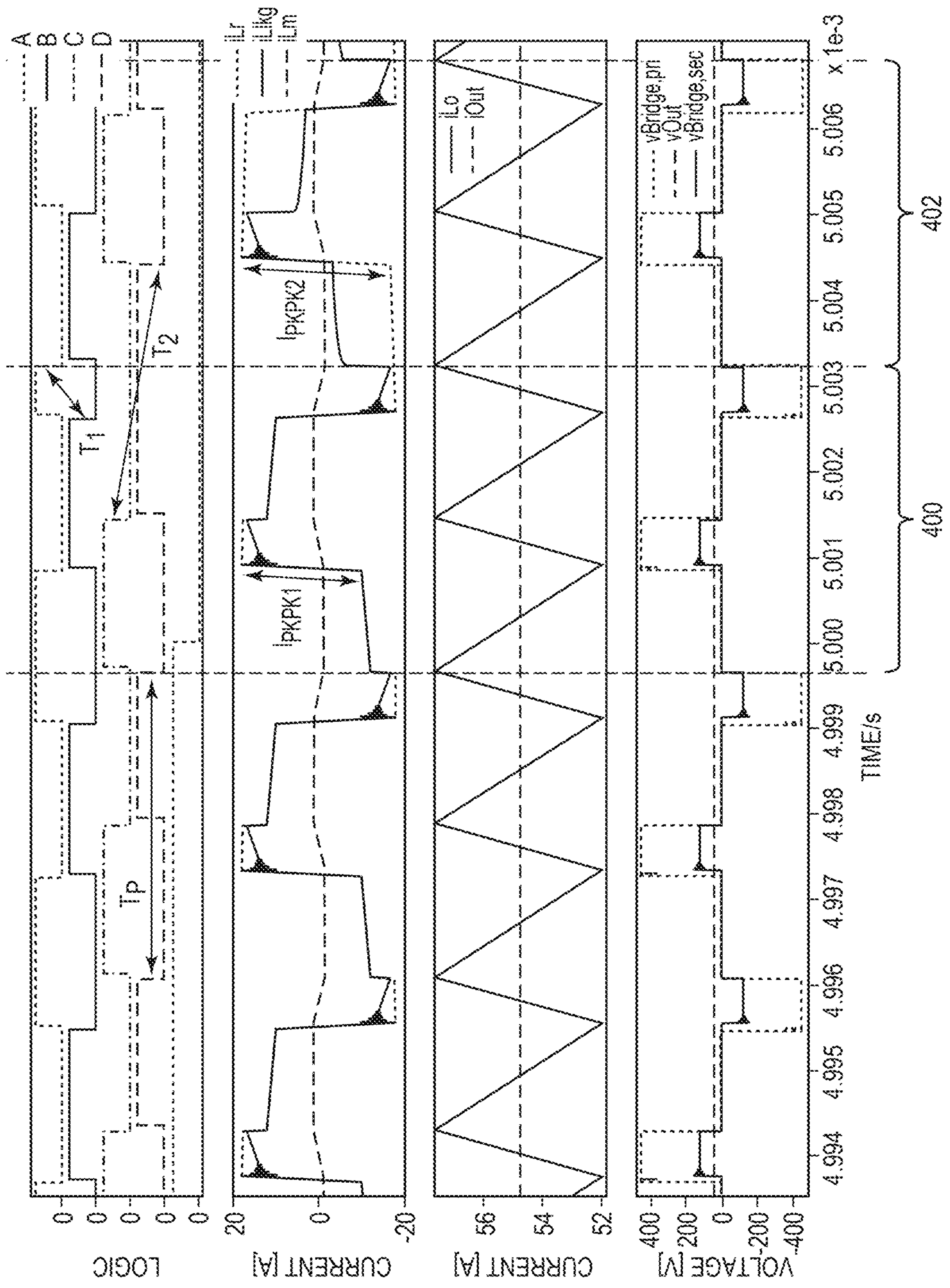
FIG. 4 illustrates various waveforms associated with operation of the PSFB converter before, during and after transition from lagging mode to leading mode, under voltage control.

FIG. 4 illustrates various waveforms associated with operation of the PSFB converter before, during and after transition from the lagging mode to the leading mode, under voltage control, under example operating conditions of 2 kW maximum power output, 450V input voltage, and 36V output voltage. In the case of voltage control, the controller 126 implements a voltage loop and adjust timings to implement a mode switchover. The duty and related timings are known ahead of time. The controller 126 can adjust the new timings for the power transfer cycle, effectively changing the duties to have a jump of phase so that the leading power transfer leg becomes the lagging power transfer leg in the next power transfer cycle or vice-versa.

The upper graph in FIG. 4 illustrates the PWM pulses A-D for the primary-side switch devices QA-QD. The next lower graph illustrates the leakage current iLlkg of the transformer 100, the magnetizing current iLm of the transformer 100, and the current iLr in the primary-side inductor $L_R$. The next lower graph illustrates the current iLo in the output inductor $L_O$ and the output current iOut of the PSFB converter. The lowermost graph illustrates the primary-side bridge voltage vBridge,pri, the secondary-side bridge voltage vBridge,sec, and the output voltage vOut of the PSFB converter.

As indicated in the uppermost graph of FIG. 4, the controller 126 shortens the pair of PWM pulses A, B that control the first pair of primary-side switch devices QA, QB to a period $T_1$ that terminates at the end of the last power transfer cycle 400 in the lagging mode, where a falling edge to falling edge of Vbridge,pri indicates one power transfer cycle. The controller 126 also lengthens the pair of PWM pulses C, D that control the second pair of primary-side switch devices QC, QD to a period $T_2$ that extends into the first power transfer cycle 402 in the leading mode.

Accordingly, the leg acting as the leading power transfer leg is terminated at the end of the power transfer duty during the mode transition and becomes the lagging power transfer leg thereafter, and the leg acting as the lagging power transfer leg gets extended until reaching the adjusted shift for what would be the leading leg from thereafter. The controller 126 implements a jump in PWM pulses to switch modes, as indicated in the uppermost graph of FIG. 4. This means that for a single PWM pulse, the period TP of the PWM pulse changes but there is no change for the entire power transfer cycle. The period TP corresponds to the fundamental switching frequency of PSFB converter, which in steady state corresponds to the PWM frequency for each of the legs. With this approach, there is no change in effective duty over the output inductor $L_O$ and therefore no change in iLo or Vo.

In one embodiment, the controller 126 exchanges timer event connections on the fly for both PWM carriers to implement the changes to $T_1$ and $T_2$. For example, the controller 126 may control the shift between PWM pulses using an additional timer. In one embodiment, the additional timer implements $$T_1 = D \cdot \frac{T_P}{2} + T_4 \text{ and } T_2 = \frac{T_P}{2} + (1 - D) \cdot \frac{T_P}{2} - T_4,$$

where D is the duty cycle of the primary-side full-bridge, $T_P$ is switching period, and $T_4$ is a peak current difference between two power transfer cycles. With other peripherals such as table-based commutation rules, the controller 126 may implement the modulation scheme by programming the corresponding times for the PWM pulses of the respective legs during steady state, during transitions between modes, and in a new mode.

Figure 5:
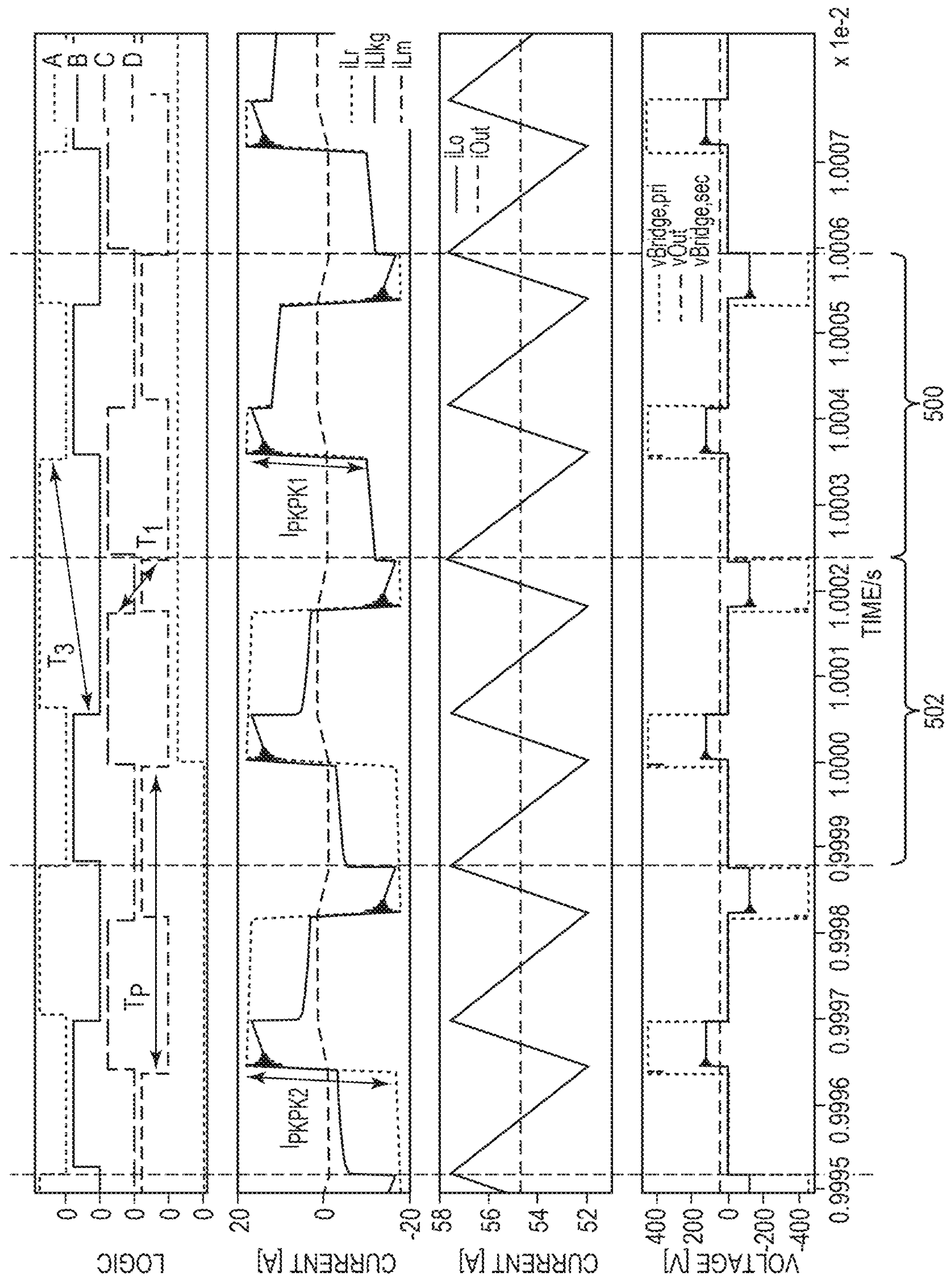
FIG. 5 illustrates various waveforms associated with operation of the PSFB converter before, during and after transition from leading mode to lagging mode, under voltage control.

FIG. 5 illustrates various waveforms associated with operation of the PSFB converter before, during and after transition from the leading mode to the lagging mode, under voltage control. The same waveforms are shown in FIG. 5 as in FIG. 4 and for the same example operating conditions of 2 kW maximum power output, 450V input voltage, and 36V output voltage.

As indicated in the uppermost graph of FIG. 5, the controller 126 lengthens the pair of PWM pulses A, B that control the first pair of primary-side switch devices QA, QB to a period $T_3$ that extends into the first power transfer cycle 500 in the lagging mode. The controller 126 also shortens the pair of PWM pulses C, D that control the second pair of primary-side switch devices QC, QD to a period $T_1$ that terminates at the end of the last power transfer cycle 502 in the leading mode. As is the case with transitioning from the lagging mode to the leading mode, no change in effective duty occurs over the output inductor $L_O$ and therefore there is no change in iLo or Vo when transitioning from the leading mode to the lagging mode. In one embodiment, $$T_3 = \frac{T_P}{2} + (1 - D) \cdot \frac{T_P}{2} + T_4 \text{ and } T_1 = D \cdot \frac{T_P}{2} - T_4.$$

Figure 6:
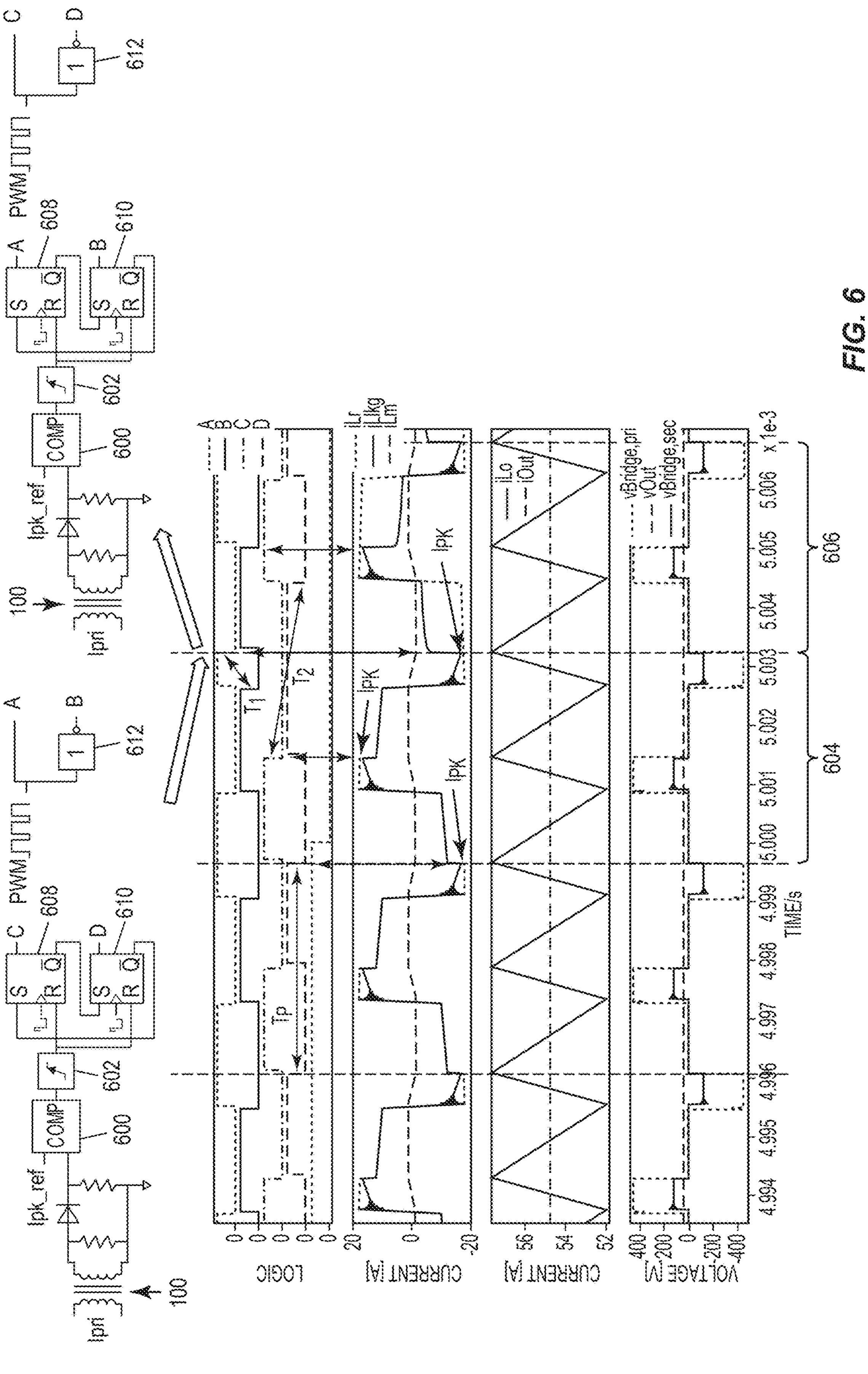
FIG. 6 illustrates various waveforms associated with operation of the PSFB converter before, during and after transition from lagging mode to leading mode, under peak current control.

FIG. 6 illustrates various waveforms associated with operation of the PSFB converter before, during and after transition from the lagging mode to the leading mode, under peak current control. In the case of peak current control, comparator events in the controller 126 determine the period of the duty. A change of a comparator event can be used to implement a mode switchover. For example, the controller 126 can detect a peak current event using a comparator. When a peak current event is detected/triggered, the controller 126 can switch modes (i.e. the leading power transfer leg becomes the lagging power transfer leg in the next power transfer cycle or vice-versa). The power transfer leg that finishes the power transfer is controlled by the comparator, and the controller 126 can reassign the comparator to the other power transfer leg when a switchover occurs.

The same waveforms are shown in FIG. 6 as in FIGS. 4 and 5 and for the same example operating conditions of 2 kW maximum power output, 450V input voltage, and 36V output voltage. As indicated in FIG. 6, the controller 126 includes a comparator 600 that compares a primary-side current measurement Ipri to a reference value Ipk_ref to determine when a peak current level $I_{PK}$ is reached. Detection of the peak current level $I_{PK}$ may be implemented by a rising (or falling) edge detector 602 of the controller 126, for example.

In FIG. 6, the controller 126 terminates the pair of PWM pulses A, B that control the first pair of primary-side switch devices QA, QB at the end of the last power transfer cycle 604 in the lagging mode in response to the comparator 600 detecting the peak current level $I_{PK}$, e.g. via the edge detector 602. The early pulse termination is indicated by '$T_1$' in FIG. 6. The controller 126 also extends the pair of PWM pulses C, D that control the second pair of primary-side switch devices QC, QD into the first power transfer cycle 606 in the leading mode in response to the comparator 600 detecting the peak current level $I_{PK}$, e.g. via the edge detector 602. The pulse extension is indicated by '$T_2$' in FIG. 6.

As indicated in the upper part of FIG. 6, the controller 126 may include a pair of SR latches 608, 610 that generate the PWM pulses C, D for the second pair of primary-side switch devices QC, QD and which are reset by each edge detection event in the lagging mode. The PWM pulses A, B that control the first pair of primary-side switch devices QA, QB may be derived from a base PWM signal and an inverter 612 in the lagging mode. The controller 126 reverses the comparator assignment for the leading mode, also as indicated in the upper part of FIG. 6, such that the PWM pulses A, B for the first pair of primary-side switch devices QA, QB are generated by the pair of SR latches 608, 610 and the PWM pulses C, D for the second pair of primary-side switch devices QC, QD are derived from the base PWM signal and corresponding inverter 612 in the leading mode.

Figure 7:
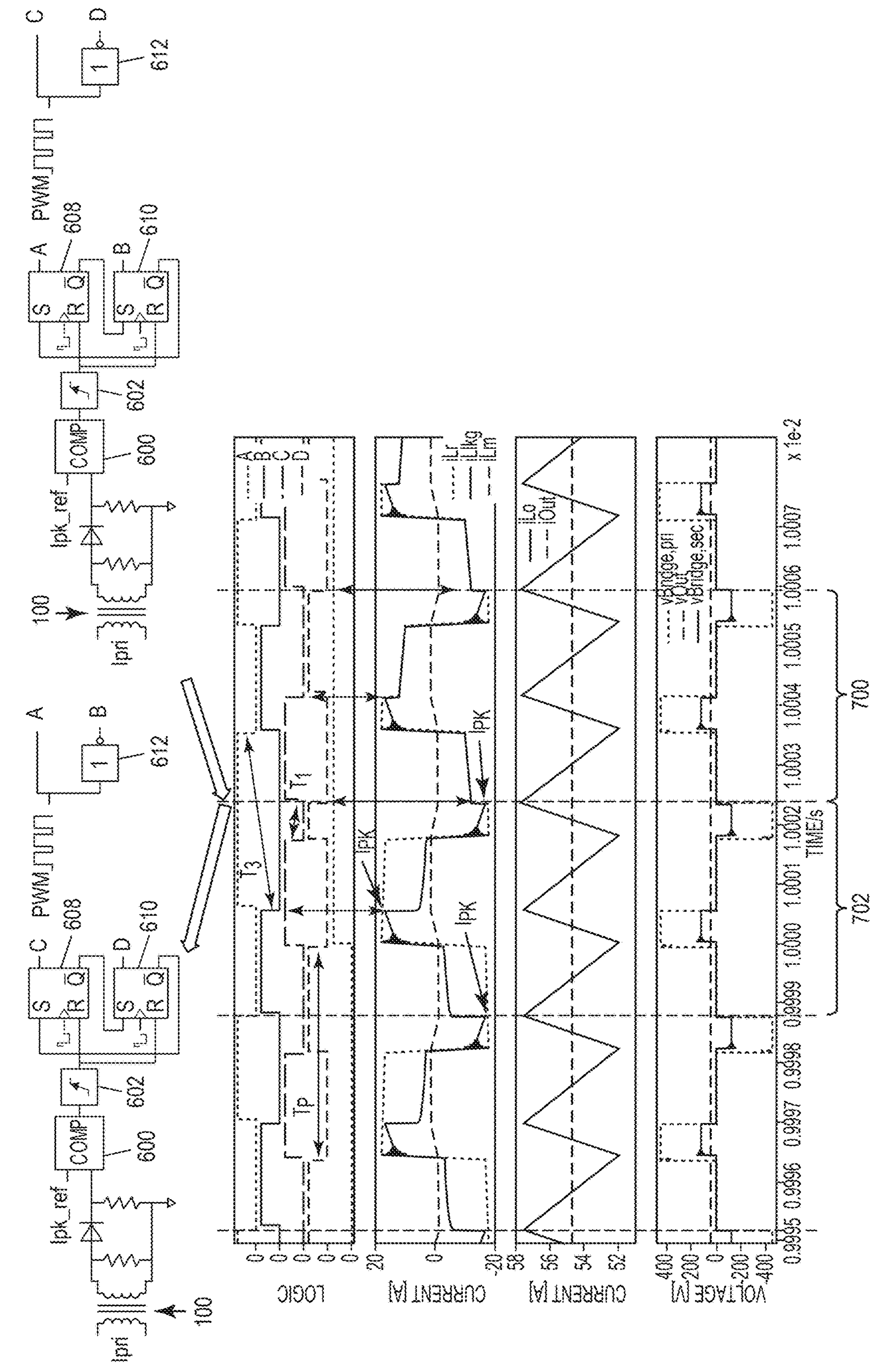
FIG. 7 illustrates various waveforms associated with operation of the PSFB converter before, during and after transition from leading mode to lagging mode, under peak current control.

FIG. 7 illustrates various waveforms associated with operation of the PSFB converter before, during and after transition from the leading mode to the lagging mode, under peak current control. The same waveforms are shown in FIG. 7 as in FIGS. 4-6 and for the same example operating conditions of 2 kW maximum power output, 450V input voltage, and 36V output voltage.

In FIG. 7, the comparator 600 compares the primary-side current measurement Ipri to the reference value Ipk_ref to determine when the peak current level $I_{PK}$ is reached, e.g. via the edge detector 602. The controller 126 extends the pair of PWM pulses A, B that control the first pair of primary-side switch devices QA, QB into the first power transfer cycle 700 in the lagging mode in response to the comparator 600 detecting the peak current level $I_{PK}$, e.g. via the edge detector 602. The pulse extension is indicated by '$T_3$' in FIG. 7. The controller 126 also terminates the pair of PWM pulses C, D that control the second pair of primary-side switch devices QC, QD at the end of the last power transfer cycle 702 in the leading mode in response to the comparator 600 detecting the peak current level $I_{PK}$, e.g. via the edge detector 602.

As indicated in the upper part of FIG. 7, the pair of SR latches 608, 610 generate the PWM pulses C, D for the second pair of primary-side switch devices QC, QD and which are reset by each edge detection event in the leading mode. The PWM pulses A, B that control the first pair of primary-side switch devices QA, QB may be derived from a base PWM signal and an inverter 612 in the leading mode. The controller 126 reverses the comparator assignment for the lagging mode, also as indicated in the upper part of FIG. 7, such that the PWM pulses A, B for the first pair of primary-side switch devices QA, QB are generated by the pair of SR latches 608, 610 and the PWM pulses C, D for the second pair of primary-side switch devices QC, QD are derived from the base PWM signal and corresponding inverter 612 in the lagging mode.

The commutation time of the primary side current Ipri consumes part of the system duty. This loss of effective duty depends on the input voltage, the output current, and the size of the series inductance $L_R$. For peak current control of the PSFB converter, the duty of the converter primary side naturally adapts to reach the effective duty and therefore closely correlates to the primary peak current $I_{PK}$. For voltage control of the PSFB converter, the controller 126 may implement a slight compensation of the different loss of duty cycle between lagging and leading modes.

In lagging mode, there is less circulating current and less loss of effective duty cycle. In leading mode, there is more circulating current and more loss of effective duty cycle. When transitioning from one mode to the other mode, the controller 126 may adjust for a difference in duty cycle loss between the two modes, e.g. by adding or subtracting the difference while changing modes. The difference in duty cycle loss may be predetermined. For example, the difference can be computed offline for the different modes. In another embodiment, the controller 126 estimates the difference in duty cycle loss during operation (runtime) of the PSFB converter, for an even more seamless change between modes.

The modulation technique described herein boosts the efficiency of the PSFB converter at different load ranges, with seamless transitions between modes. At heavier loads, the PSFB converter operates with the lagging power transfer leg connected to the series inductor $L_R$ and the clamping diodes. At light loads the converter operates with the leading leg connected to the series inductor $L_R$ and the snubber/clamping diodes D1, D2. The change between modes is implemented during runtime, without changes in circuitry, and without impact in the regulation of the PSFB converter, due to a proper pulse pattern always being applied as shown in FIGS. 4 through 7.

Although the present disclosure is not so limited, the following numbered examples demonstrate one or more aspects of the disclosure.

Example 1. A phase shift full bridge (PSFB) converter, comprising: a transformer having a primary side and a secondary side; a full-bridge comprising a first pair of switch devices connected in series at a first node coupled to a first terminal of the primary side, and a second pair of switch devices connected in series at a second node coupled to a second terminal of the primary side; a pair of diode devices connected in series at a third node coupled to the first terminal of the primary side; an inductor coupled between the first node and the third node; a rectifier coupled to the secondary side; and a controller, wherein in a first mode, the controller is configured to operate the second pair of switch devices as a leading power transfer leg and the first pair of switch devices as a lagging power transfer leg each power transfer cycle, wherein in a second mode, the controller is configured to operate the first pair of switch devices as the leading power transfer leg and the second pair of switch devices as the lagging power transfer leg each power transfer cycle, wherein the controller is configured to seamlessly transition between the first and second modes without interruption of the PSFB converter.

Example 2. The PSFB converter of example 1, wherein an indicator that indicates when the controller is to transition from one mode to the other mode is adjustable.

Example 3. The PSFB converter of example 2, wherein the controller is configured to adjust the indicator based on efficiency data collected during use of the PSFB converter.

Example 4. The PSFB converter of any of examples 1 through 3, wherein to seamlessly transition from one mode to the other mode without interruption of the PSFB converter, the controller is configured to terminate the pair of switch devices acting as the leading power transfer leg at the end of the present power transfer cycle so that this pair of switch devices becomes the lagging power transfer leg for the next power transfer cycle, and extend the pair of switch devices acting as the lagging power transfer leg into the next power transfer cycle so that this pair of switch devices becomes the leading power transfer leg for the next power transfer cycle.

Example 5. The PSFB converter of any of examples 1 through 4, wherein to transition from the first mode to the second mode, the controller is configured to shorten a pair of PWM (pulse width modulation) pulses that control the first pair of switch devices and lengthen a pair of PWM pulses that control the second pair of switch devices at the end of the last power transfer cycle in the first mode, such that the first pair of switch devices becomes the leading power transfer leg and the second pair of switch devices becomes the lagging power transfer leg for the first power transfer cycle in the second mode.

Example 6. The PSFB converter of example 5, wherein the controller is configured to shorten the pair of PWM pulses that control the first pair of switch devices to a period $T_1$ that terminates at the end of the last power transfer cycle in the first mode, where $$T_1 = D\cdot\frac{T_P}{2} + T_4,$$

D is a duty cycle of the full-bridge, $T_P$ is switching period, and $T_4$ is a peak current difference between two power transfer cycles.

Example 7. The PSFB converter of example 5 or 6, wherein the controller is configured to lengthen the pair of PWM pulses that control the second pair of switch devices to a period $T_2$ that extends into the first power transfer cycle in the second mode, where $$T_2 = \frac{T_P}{2} + (1-D)\cdot\frac{T_P}{2} - T_4,$$

D is a duty cycle of the full-bridge, $T_P$ is switching period, and $T_4$ is a peak current difference between two power transfer cycles.

Example 8. The PSFB converter of example 5, wherein the controller comprises a comparator configured to compare a primary-side current measurement to a reference value to determine when a peak current level is reached, and wherein the controller is configured to terminate the pair of PWM pulses that control the first pair of switch devices at the end of the last power transfer cycle in the first mode in response to the comparator detecting the peak current level.

Example 9. The PSFB converter of example 5 or 8, wherein the controller comprises a comparator configured to compare a primary-side current measurement to a reference value to determine when a peak current level is reached, and wherein the controller is configured to extend the pair of PWM pulses that control the second pair of switch devices into the first power transfer cycle in the second mode in response to the comparator detecting the peak current level.

Example 10. The PSFB converter of any of examples 1 through 9, wherein to transition from the second mode to the first mode, the controller is configured to lengthen a pair of PWM (pulse width modulation) pulses that control the first pair of switch devices and shorten a pair of PWM pulses that control the second pair of switch devices at the end of the last power transfer cycle in the second mode, such that the second pair of switch devices becomes the leading power transfer leg and the first pair of switch devices becomes the lagging power transfer leg for the first power transfer cycle in the first mode.

Example 11. The PSFB converter of example 10, wherein the controller is configured to lengthen the pair of PWM pulses that control the first pair of switch devices to a period $T_3$ that extends into the first power transfer cycle in the first mode, where $$T_3 = \frac{T_P}{2} + (1-D)\cdot\frac{T_P}{2} + T_4,$$

D is a duty cycle of the full-bridge, $T_P$ is switching period, and $T_4$ is a peak current difference between two power transfer cycles.

Example 12. The PSFB converter of example 10 or 11, wherein the controller is configured to shorten the pair of PWM pulses that control the second pair of switch devices to a period $T_1$ that terminates at the end of the last power transfer cycle in the second mode, where $$T_1 = D \cdot \frac{T_P}{2} - T_4,$$

D is a duty cycle of the full-bridge, $T_P$ is switching period, and $T_4$ is a peak current difference between two power transfer cycles.

Example 13. The PSFB converter of example 10, wherein the controller comprises a comparator configured to compare a primary-side current measurement to a reference value to determine when a peak current level is reached, and wherein the controller is configured to extend the pair of PWM pulses that control the first pair of switch devices into the first power transfer cycle in the first mode in response to the comparator detecting the peak current level.

Example 14. The PSFB converter of example 10 or 13, wherein the controller comprises a comparator configured to compare a primary-side current measurement to a reference value to determine when a peak current level is reached, and wherein the controller is configured to terminate the pair of PWM pulses that control the second pair of switch devices at the end of the last power transfer cycle in the second mode in response to the comparator detecting the peak current level.

Example 15. The PSFB converter of any of examples 1 through 14, wherein when transitioning from one mode to the other mode, the controller is further configured to adjust for a difference in duty cycle loss between the first and second modes.

Example 16. The PSFB converter of example 15, wherein the difference in duty cycle loss is predetermined.

Example 17. The PSFB converter of example 15, wherein the controller is configured to estimate the difference in duty cycle loss during operation of the PSFB converter.

Example 18. The PSFB converter of any of examples 1 through 17, wherein in the first mode, the second pair of switch devices energizes the inductor during a first part of each power transfer cycle and the first pair of switch devices energizes the inductor during a second part of each power transfer cycle that follows the first part, and wherein in the second mode, the first pair of switch devices energizes the inductor during the first part of each power transfer cycle and the second pair of switch devices energizes the inductor during the second part of each power transfer cycle.

Example 19. The PSFB converter of any of examples 1 through 18, wherein the controller is configured to operate in the first mode at heavier load conditions and operate in the second mode at lighter load conditions.

Example 20. A method of operating a phase shift full bridge (PSFB) converter that includes a transformer having a primary side and a secondary side, a full-bridge comprising a first pair of switch devices connected in series at a first node coupled to a first terminal of the primary side, and a second pair of switch devices connected in series at a second node coupled to a second terminal of the primary side, a pair of diode devices connected in series at a third node coupled to the first terminal of the primary side, an inductor coupled between the first node and the third node, and a rectifier coupled to the secondary side, the method comprising: in a first mode, operating the second pair of switch devices as a leading power transfer leg and the first pair of switch devices as a lagging power transfer leg each power transfer cycle; in a second mode, operating the first pair of switch devices as the leading power transfer leg and the second pair of switch devices as the lagging power transfer leg each power transfer cycle; and seamlessly transitioning between the first and second modes without interruption of the PSFB converter.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to cover all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A phase shift full bridge (PSFB) converter, comprising:
- a transformer having a primary side and a secondary side;
- a full-bridge comprising a first pair of switch devices connected in series at a first node coupled to a first terminal of the primary side, and a second pair of switch devices connected in series at a second node coupled to a second terminal of the primary side;
- a pair of diode devices connected in series at a third node coupled to the first terminal of the primary side;
- an inductor coupled between the first node and the third node;
- a rectifier coupled to the secondary side; and
- a controller,
- wherein in a first mode, the controller is configured to operate the second pair of switch devices as a leading power transfer leg and the first pair of switch devices as a lagging power transfer leg each power transfer cycle,
- wherein in a second mode, the controller is configured to operate the first pair of switch devices as the leading power transfer leg and the second pair of switch devices as the lagging power transfer leg each power transfer cycle,
- wherein the controller is configured to seamlessly transition between the first and second modes without interruption of the PSFB converter, wherein to seamlessly transition from one mode to the other mode without interruption of the PSFB converter, the controller is configured to terminate the pair of switch devices acting as the leading power transfer leg at the end of the present power transfer cycle so that this pair of switch devices becomes the lagging power transfer leg for the next power transfer cycle, and extend the pair of switch devices acting as the lagging power transfer leg into the next power transfer cycle so that this pair of switch devices becomes the leading power transfer leg for the next power transfer cycle.

2. The PSFB converter of claim 1, wherein an indicator that indicates when the controller is to transition from one mode to the other mode is adjustable.

3. The PSFB converter of claim 2, wherein the controller is configured to adjust the indicator based on efficiency data collected during use of the PSFB converter.

4. The PSFB converter of claim 1, wherein to transition from the first mode to the second mode, the controller is configured to shorten a pair of PWM (pulse width modulation) pulses that control the first pair of switch devices and lengthen a pair of PWM pulses that control the second pair of switch devices at the end of the last power transfer cycle in the first mode, such that the first pair of switch devices becomes the leading power transfer leg and the second pair of switch devices becomes the lagging power transfer leg for the first power transfer cycle in the second mode.

5. The PSFB converter of claim 4, wherein the controller is configured to shorten the pair of PWM pulses that control the first pair of switch devices to a period $T_1$ that terminates at the end of the last power transfer cycle in the first mode, where $$T_1 = D \cdot \frac{T_P}{2} + T_4,$$

is a duty cycle of the full-bridge, $T_P$ is switching period, and $T_4$ is a peak current difference between two power transfer cycles.

6. The PSFB converter of claim 4, wherein the controller is configured to lengthen the pair of PWM pulses that control the second pair of switch devices to a period $T_2$ that extends into the first power transfer cycle in the second mode, where $$T_2 = \frac{T_P}{2} + (1 - D) \cdot \frac{T_P}{2} - T_4,$$

D is a duty cycle of the full-bridge, $T_P$ is switching period, and $T_4$ is a peak current difference between two power transfer cycles.

7. The PSFB converter of claim 4, wherein the controller comprises a comparator configured to compare a primary-side current measurement to a reference value to determine when a peak current level is reached, and wherein the controller is configured to terminate the pair of PWM pulses that control the first pair of switch devices at the end of the last power transfer cycle in the first mode in response to the comparator detecting the peak current level.

8. The PSFB converter of claim 4, wherein the controller comprises a comparator configured to compare a primary-side current measurement to a reference value to determine when a peak current level is reached, and wherein the controller is configured to extend the pair of PWM pulses that control the second pair of switch devices into the first power transfer cycle in the second mode in response to the comparator detecting the peak current level.

9. The PSFB converter of claim 1, wherein to transition from the second mode to the first mode, the controller is configured to lengthen a pair of PWM (pulse width modulation) pulses that control the first pair of switch devices and shorten a pair of PWM pulses that control the second pair of switch devices at the end of the last power transfer cycle in the second mode, such that the second pair of switch devices becomes the leading power transfer leg and the first pair of switch devices becomes the lagging power transfer leg for the first power transfer cycle in the first mode.

10. The PSFB converter of claim 9, wherein the controller is configured to lengthen the pair of PWM pulses that control the first pair of switch devices to a period $T_3$ that extends into the first power transfer cycle in the first mode, where $$T_3 = \frac{T_P}{2} + (1 - D) \cdot \frac{T_P}{2} + T_4,$$

D is a duty cycle of the full-bridge, $T_P$ is switching period, and $T_4$ is a peak current difference between two power transfer cycles.

11. The PSFB converter of claim 9, wherein the controller is configured to shorten the pair of PWM pulses that control the second pair of switch devices to a period $T_1$ that terminates at the end of the last power transfer cycle in the second mode, where $$T_1 = D \cdot \frac{T_P}{2} - T_4,$$

D is a duty cycle of the full-bridge, $T_P$ is switching period, and $T_4$ is a peak current difference between two power transfer cycles.

12. The PSFB converter of claim 9, wherein the controller comprises a comparator configured to compare a primary-side current measurement to a reference value to determine when a peak current level is reached, and wherein the controller is configured to extend the pair of PWM pulses that control the first pair of switch devices into the first power transfer cycle in the first mode in response to the comparator detecting the peak current level.

13. The PSFB converter of claim 9, wherein the controller comprises a comparator configured to compare a primary-side current measurement to a reference value to determine when a peak current level is reached, and wherein the controller is configured to terminate the pair of PWM pulses that control the second pair of switch devices at the end of the last power transfer cycle in the second mode in response to the comparator detecting the peak current level.

14. The PSFB converter of claim 1, wherein when transitioning from one mode to the other mode, the controller is further configured to adjust for a difference in duty cycle loss between the first and second modes.

15. The PSFB converter of claim 14, wherein the difference in duty cycle loss is predetermined.

16. The PSFB converter of claim 14, wherein the controller is configured to estimate the difference in duty cycle loss during operation of the PSFB converter.

17. The PSFB converter of claim 1, wherein in the first mode, the second pair of switch devices energizes the inductor during a first part of each power transfer cycle and the first pair of switch devices energizes the inductor during a second part of each power transfer cycle that follows the first part, and wherein in the second mode, the first pair of switch devices energizes the inductor during the first part of each power transfer cycle and the second pair of switch devices energizes the inductor during the second part of each power transfer cycle.

18. The PSFB converter of claim 1, wherein the controller is configured to operate in the first mode at heavier load conditions and operate in the second mode at lighter load conditions.

19. A phase shift full bridge (PSFB) converter, comprising:

a transformer having a primary side and a secondary side;

a full-bridge comprising a first pair of switch devices connected in series at a first node coupled to a first terminal of the primary side, and a second pair of switch devices connected in series at a second node coupled to a second terminal of the primary side;

a pair of diode devices connected in series at a third node coupled to the first terminal of the primary side;

an inductor coupled between the first node and the third node;

a rectifier coupled to the secondary side; and a controller, wherein in a first mode, the controller is configured to operate the second pair of switch devices as a leading power transfer leg and the first pair of switch devices as a lagging power transfer leg each power transfer cycle, wherein in a second mode, the controller is configured to operate the first pair of switch devices as the leading power transfer leg and the second pair of switch devices as the lagging power transfer leg each power transfer cycle, wherein the controller is configured to seamlessly transition between the first and second modes without interruption of the PSFB converter, wherein when transitioning from one mode to the other mode, the controller is further configured to adjust for a difference in duty cycle loss between the first and second modes.

20. The PSFB converter of claim 19, wherein the difference in duty cycle loss is predetermined.

21. The PSFB converter of claim 19, wherein the controller is configured to estimate the difference in duty cycle loss during operation of the PSFB converter.

* * * * *